United States Patent Office 2,971,970
Patented Feb. 14, 1961

2,971,970

ORGANOSILICON PROCESS

Ben A. Bluestein, Schenectady, N.Y., assignor to General Electric Company, a corporation of New York No Drawing. Filed Dec. 29, 1958, Ser. No. 783,102

28 Claims. (Cl. 260—448.2)

This invention relates to a process for the preparation of hydrolyzable β-cyanoalkylsilanes. More particularly, this invention relates to the catalytic addition of hydrolyzable silicon hydrides to alpha, beta-unsatrated olefinic nitriles to form beta-cyanoalkylsilanes and to the catalyst system employed in this process.

Prior to the present invention, a nmber of methods have been suggested for the addition of hydrolyzable silicon-hydrides to alpha, beta-unsaturated olefinic nitriles. One method suggested for effecting this reaction is by the use of heat. This method, while producing addition products, is disadvantageous in two important respects. First, the thermal addition requires temperatures of from about 150° C. to 400° C. and at these temperatures many olefinic nitriles undergo thermal polymerization. Furthermore, the thermal addition of the hydride to the olefin often results in the alpha addition product. For example, the reaction between trichlorosilane and acrylonitrile at a temperature of 200° C. and under autogenous pressure results in the formation of alpha-cyanoethyl trichlorosilane in poor yield with no detectable amount of beta-cyanoethyltrichlorosilane.

While alpha-cyanoethyltrichlorosilane is useful in a number of applications, it is of limited use in the preparation of organopolysiloxanes which must be subjected to both elevated temperatures and moist conditions. Under these conditions, the alpha-cyanoethyl group tends to hydrolyze, causing degradation of the organopolysiloxane. On the other hand, the silicon-bonded beta-cyanoethyl radical is extremely resistant to hydrolysis and cleavage under hot, humid conditions and find particular use in the preparation of organopolysiloxanes which must be subjected to hot, humid conditions and which also must be used in contact with liquid hydrocarbons which have a severe swelling effect on conventional organopolysiloxanes such as methylpolysiloxanes and methylphenylpolysiloxanes. The cyanoalkyl group attached to silicon in organopolysiloxanes tends to stabilize these organopolysiloxanes against swelling in such hydrocarbon materials.

Another method suggested for the addition of hydrolyzable silicon hydrides to olefinic nitriles is by conducting the reaction in the presence of a peroxide catalyst. This method is also disadvantageous in that the reaction must, of course, be carried out under conditions under which the peroxide begins decomposing. Since this temperature is generally high enough to cause free radical polymerization of the olefin, it is found that this attempted addition results in the formation of large amounts of polymer rather than of the addition product.

A very efficient and useful method for the addition of hydrolyzable silicon hydrides to olefinic nitriles is the method described and claimed in the copending application of Maurice Prober, Serial No. 401,702, filed December 31, 1953, and assigned to the assignee of the present invention. By the method of this Prober application, it is possible to produce materials such as beta-cyanoethyltrichlorosilane in high yield by the reaction of trichlorosilane and acrylonitrile in the presence of tertiary amine catalysts such as trialkylamines and various heterocyclic tertiary amines. However, while the tertiary amine catalyzed addition reaction of the aforementioned Prober application is very useful for the preparation of trifunctional materials such as beta-cyanoethyltrichlorosilane, the Prober process is commercially unattractive for the preparation of difunctional silanes, such as beta-cyanoethylmethyldichlorosilane, because of a very slow reaction rate and because of the relatively poor yields of products. Thus, when one attempts to react methyldichlorosilane with acrylonitrile in the presence of a tertiary amine such as tributylamine, the reaction product contains only a few percent of beta-cyanoethylmethyldichlorosilane. Similarly, the process of the aforementioned Prober application is very useful in the preparation of beta-cyanopropyltrichlorosilane by the reaction of methacrylonitrile and trichlorosilane in the presence of a tertiary amine. However, when attempting to form beta-cyanopropylmethyldichlorosilane by the Prober process, the yield of the desired product is again only a few percent.

The need for difunctional beta-cyanoalkylsilanes becomes immediately apparent when one considers that organosilicon fluids and elastomers are composed almost entirely of difunctional units. Since a major segment of commercial organosilicon products is in the fluid and elastomer fields, it is obvious that a commercial process for the preparation of difunctional silanes containing silicon-bonded cyanoalkyl radicals is necessary. The present invention provides such a process and a catalyst for such a process.

The present invention is based on my discovery of a multiple component catalyst system which is useful for the production of commercial quantities of difunctional beta-cyanoalkylsilanes by reacting mono-substituted dichlorosilanes, such as methyl or phenyldichlorosilane, with alpha, beta-unsaturated olefinic nitriles to form the difunctional beta-cyanoalkylsilanes, such as beta-cyanoethylmethyldichlorosilane and beta-cyanoethylphenyldichlorosilane. In addition, this catalyst system is also useful in the preparation of trifunctional and monofunctional beta-cyanoalkylsilanes, such as beta-cyanoethyltrichlorosilane by the addition of trichlorosilane to acrylonitrile and beta-cyanoethylmethylchlorosilane by the addition of methylchlorosilane to acrylonitrile.

The catalyst system employed in the practice of the present invention comprises (A) a cuprous compound selected from the class consisting of cuprous halides, and cuprous oxide, (B) a diamine having the formula (1) $(R)(R')N(CH_2)_mN(R')_2$ where $m$ is an integer from 1 to 6, inclusive, R is a lower alkyl radical and R' is a member selected from the class consisting of hydrogen, lower alkyl radicals, aminoalkyl radicals, alkylaminoalkyl radicals and dialkylaminoalkyl radicals, and mixtures thereof. In the preferred embodiment of my invention the catalyst system also includes a trialkylamine in addition to the cuprous compound and the diamine previously mentioned.

The hydrolyzable silicon hydrides employed in the practice of the present invention can be described as containing from one to three silicon-bonded hydrogens, from one to three silicon-bonded halogens selected from the class consisting of fluorine, chlorine, bromine and iodine, and up to 1 monovalent hydrocarbon radical or substituted monovalent hydrocarbon wherein the substituent is inert with respect to the addition reaction. These hydrolyzable silicon hydrides are described by the following formula (2) $(R'')_nSi(H)_a(X)_{4-(n+a)}$ where $n$ is a whole number equal to from 0 to 1, inclusive, $a$ is an integer equal to from 1 to 3, inclusive, the sum of $n$ plus $a$ is from 1 to 3, inclusive, X is halogen and R″ is selected from the class consisting of monovalent hydrocarbon radicals and substituted monovalent hydrocarbon radicals wherein the substituent is inert with respect to the addition reaction. Among the radicals which R″ represents are included, for example, alkyl radicals, e.g., methyl, ethyl, butyl, octyl, octadecyl, etc. radicals and preferably lower alkyl radicals containing from 1 to 8 carbon atoms; aryl radicals, e.g., phenyl, napthyl, diphenyl, tolyl, xylyl, ethylphenyl, etc. radicals; aralkyl radicals, e.g., benzyl, phenylethyl, etc. radicals; haloaryl radicals, e.g., chlorophenyl, dibromophenyl, chloronapthyl, etc. radicals, cyanoalkyl radicals, e.g., beta-cyanoethyl, beta-cyanopropyl, beta-cyanobutyl, etc. radicals; cycloalkyl radicals, e.g., cyclohexyl, cycloheptyl, etc. radicals; olefinically unsaturated radicals, e.g., vinyl, allyl, etc. radicals. Among the many specific hydrolyzable silicon hydrides within the scope of Formula 2 are included, for example, trichlorosilane, methyldichlorosilane, phenyldichlorosilane, ethyldichlorosilane, beta-cyanoethyldichlorosilane, para-chlorophenyldichlorosilane, benzyldichlorosilane, octyldichlorosilane, dichlorosilane, chlorosilane, vinyldichlorosilane, methylchlorosilane, etc.

The alpha, beta-unsaturated olefinic nitrile employed in the process of the present invention can be described by the following structural formula (3) 

where Y represents the same or different members selected from the class consisting of hydrogen and lower alkyl radicals, e.g., alkyl radicals having from 1 to 8 carbon atoms. Among the specific nitriles within the scope of Formula 3 may be mentioned, for example, acrylonitrile, methacrylonitrile, crotononitrile, ethylacrylonitrile, 1-cyanobutene-1, 2-cyanooctene-1, etc.

The addition of the hydrolyzable silicon hydride within the scope of Formula 2 to the alpha, beta-unsaturated olefinic nitrile within the scope of Formula 3 results in the formation of hydrolyzable beta-cyanoalkylsilanes within the scope of the following formula (4) 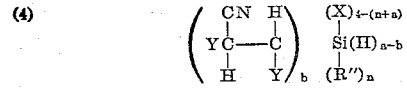

where $n$, $a$, X, R″, Y, and the sum of $n+a$ are as previously defined, $b$ has a value of from 1 to 2, inclusive, and $a-b$ is a whole number from zero to 2, inclusive. Specific hydrolyzable beta-cyanoalkylsilanes within the scope of Formula 4 include, for example:

beta-cyanoethyltrichlorosilane,
beta-cyanoethylmethyldichlorosilane,
beta-cyanoethylethyldichlorosilane,
beta-cyanopropyltrichlorosilane,
beta-cyanopropylmethyldichlorosilane,
beta-cyanobutyloctyldichlorosilane,
beta-cyanoethylphenyldichlorosilane,
bis-beta-cyanoethyldichlorosilane,
beta-cyanoethylcyclohexyldichlorosilane,
beta-cyanoethyl-p-chlorophenyldichlorosilane,
alpha-ethyl-beta-cyanoethylmethyldichlorosilane,
beta-cyanoethylvinyldichlorosilane,
beta-cyanoethylchlorosilane, etc.

From the foregoing description of the reactants and reaction products of the present invention, it is seen that the starting hydrolyzable silicon hydride within the scope of Formula 2 can have more than 1 silicon-bonded hydrogen and that the resulting product within the scope of Formula 4 can have more than 1 silicon-bonded beta-cyanoalkyl radical or can contain both a silicon-bonded cyanoalkyl radical and silicon-bonded hydrogen. Thus, in the reaction of hydrolyzable silicon hydrides containing more than 1 silicon-bonded hydrogen a mixture of products can be obtained. For example, when reacting chlorosilane with acrylonitrile, the reaction product contains a mixture of beta-cyanoethylchlorosilane and bis-(beta-cyanoethyl)chlorosilane.

As previously mentioned, one of the components of the multiple component catalyst system of the present invention is a diamine within the scope of Formula 1. Specific diamines within the scope of Formula 1 include, for example, N,N,N′,N′-tetramethylethylenediamine
N,N,N′,N′-tetraethylethylenediamine
N,N,N′-trimethylethylenediamine
N,N-dimethyl-N′,N′-diethylethylenediamine
N,N-dimethylethylenediamine
N-methyl-N,N′,N′-triethylethylenediamine
N,N,N′,N″,N″-pentamethyldiethylenetriamine
N,N,N′-trimethyl-N′-ethylethylenediamine
N,N,N′-trimethyl-N′-octylethylenediamine
N,N,N′,N′-tetramethylmethylenediamine
N,N′,N″,N″-tetramethyldiethylenetriamine
N,N,N′,N′-tetramethylpropylenediamine
N,N,N′-trimethyldiethylenetriamine
N-methylhexamethylenediamine Although the foregoing group of specific diamines is necessarily limited, it should be obvious to a person skilled in the art that any other diamine within the scope of Formula 1 may also be employed in the practice of the present invention.

Another component of the multiple component catalyst system employed in the practice of the present invention has been described previously as a trialkylamine. These trialkylamines can be described by the following formula (5) 

where Y′ is an alkyl radical, e.g., an alkyl radical containing from 1 to 20 carbon atoms. Among the many trialkylamines within the scope of Formula 5 can be mentioned, for example, trimethylamine, triethylamine, tributylamine, triamylamine, trioctylamine, methyldiethylamine, dimethylbutylamine, methylbutyloctylamine, dimethyloctadecylamine, etc.

In carrying out the reaction of the present invention, the olefinic nitrile, the silicon hydride and the catalyst system are merely added to a suitable reaction vessel and maintained at the desired temperature for sufficient time to effect the reaction. The time required for effecting the reaction varies greatly depending on the particular reactants, the particular catalyst system employed and the temperature of the reaction.

It has been found that the particular hydrolyzable silicon hydride employed has a marked effect on the rate of reaction. The reaction rate for a system involving trichlorosilane, such as the reaction of trichlorosilane with acrylonitrile, is so rapid that the reactants have to be added to the reaction mixture slowly so as to prevent the temperature of the reaction from getting out of hand. On the other hand, when an alkyldichlorosilane is employed in the same reaction, the reaction is relatively slow so that no special care need be taken in preparing the reaction mixture and the reaction is generally effected by supplying heat to the reactants. Intermediate in reaction rate are aryldichlorosilanes such as phenyldichlorosilane.

Of the various olefinic nitriles employed in the practice of this invention, the fastest reaction rate is observed with acrylonitrile. As the acrylonitrile becomes more substituted, the reaction rate decreases.

The reaction rate is also a function of whether the two component catalyst system or the three component catalyst system is employed. Reactions involving the three component system of the diamine, the trialkylamine and the cuprous compound are generally faster than reactions involving the catalyst system which does not contain the trialkylamine. The reaction rate is also a function of the particular diamine employed in either the two component catalyst system or the three component catalyst system. It has been found that the compound N,N,N',N'-tetramethylethylenediamine is by far the most efficient of the diamines and produces the most rapid reaction under the least vigorous reaction conditions with the best yields of desired addition product. As the methyl groups are replaced with hydrogen or alkyl radicals higher than methyl, the reaction rate begins to fall so that higher temperatures or higher catalyst concentration or longer reaction times are required to produce equivalent results.

As mentioned earlier, the multiple component catalyst composition of the present invention can contain either two components or three components. Except as noted hereinafter, no critical catalyst component concentrations have been found. The catalyst composition of the present invention may be described broadly as being selected from the class consisting of (A) a first mixture of a diamine within the scope of Formula 1, a trialkylamine, and a cuprous compound selected from the class consisting of cuprous halides and cuprous oxide, and (B) a second mixture of a diamine within the scope of Formula 1 and a cuprous compound selected from the class consisting of a cuprous halide and cuprous oxide, the total number of atoms of nitrogen in each of said mixtures being in excess of the total number of copper atoms in each of said mixtures. The requirement that the number of atoms of nitrogen be in excess of the number of atoms of copper is the critical feature referred to above. When the number of atoms of nitrogen is equal to or less than the number of atoms of copper, the catalyst systems of the present invention are inoperative to produce the desired addition product.

While no critical limitations in the components of the catalyst systems have been noted except with regard to the ratio of nitrogen atoms to copper atoms, certain preferred component ratios are designated for economic reasons. In the preferred embodiment of the invention, the catalyst composition comprises, on a mole ratio basis, from 0.1 to 20 moles of the diamine within the scope of Formula 1, from 0 to 20 moles of the trialkylamine, and from 0.1 to 20 moles of the cuprous compound, again with the total moles of nitrogen atoms being in excess of the number of moles of copper atoms. In general, there should be at least about a 10 percent excess of nitrogen atoms over copper atoms. Where all three components are present in the reaction mixture, the preferred composition, on a mole ratio basis, is from 0.1 to 20 moles each of the diamine, the trialkylamine and the cuprous compound. In referring to moles of the cuprous compound the number of moles of cuprous halide is calculated on the basis of the formula CuX and the number of moles of cuprous oxide is based on the formula CuO₁. In the two component catalyst system the preferred composition, on a mole ratio basis, is from 0.1 to 20 moles of diamine with from 0.1 to 20 moles of the cuprous compound.

The amount of catalyst composition employed in relation to the amount of hydrolyzable silicon hydride and olefinic nitrile may again vary within extremely wide limits. As is the case with most catalytic reactions, rate of reaction increases as the catalyst concentration increases, and although no critical catalyst concentration has been discovered, for economic reasons it is preferred to employ, on the basis of total moles of hydrolyzable silicon hydride and olefinic nitrile, at least 0.1 mole percent of the diamine within the scope of Formula 1 and at least 0.1 mole percent of the cuprous compound. Thus, the catalyzed reaction mixture of the present invention can be characterized as containing a hydrolyzable silicon hydride and an olefinic nitrile and a catalyst composition comprising, on the basis of total moles of hydrolyzable silicon hydride and olefinic nitrile, from 0.1 to 20 mole percent of the diamine within the scope of Formula 1, from 0 to 20 mole percent trialkylamine and from 0.1 to 20 mole percent cuprous compound, again with the total atoms of nitrogen in the reaction mixture being in excess, preferably 10 percent in excess, of the number of atoms of copper. On this same basis of the total moles of hydrolyzable silicon hydride and olefinic nitrile, the three component system comprises from 0.1 to 20 mole percent each of the diamine, the trialkylamine and the cuprous compound. On this same basis, the two component catalyst system comprises from 0.1 to 20 mole percent each of the diamine and the cuprous compound. The preferred specific range of catalyst components is from 1 to 10 mole percent of each catalyst component based on the total moles of hydrolyzable silicon hydride, regardless of whether the two component or three component catalyst system is employed.

The ratio of the hydrolyzable silicon hydride within the scope of Formula 2 to the alpha, beta-unsaturated olefinic nitrile within the scope of Formula 3 may be varied within extremely wide limits. However, since the addition reaction involves one mole of the hydrolyzable silicon hydride for one mole of the alpha, beta-unsaturated olefinic nitrile, in the preferred embodiment of my invention, equimolar amounts of the reactants are employed. The use of molar excesses of either of the two reactants is not precluded, reactions having been effected with ten-fold molar excesses of either reactant. However, no particular advantage is derived from employing a molar excess of either reactant and in fact the economics of the reaction make it preferable to employ substantially equimolar quantities.

In the preferred embodiment of the present invention, applicant's process is employed for the production of difunctional beta-cyanoalkylsilanes. In the specific preferrred embodiment of the present invention, reaction is effected between substantially equimolar amounts of methyldichlorosilane and acrylonitrile employing the three component catalyst system where the components consist of cuprous chloride, N,N,N',N'-tetramethylethylenediamine and tributylamine. This preferred embodiment of my invention provides a simple, direct, one-step method for the preparation of the difunctional beta-cyanoethylsilanes at a rapid rate and in high yield. This result is not accomplished by any method heretofore known in the art.

While the preferred embodiment of my invention relates to the preparation of difunctional silanes, it should also be understood that my process is applicable to the preparation of trifunctional beta-cyanoalkylsilanes, such as by reacting trichlorosilane with acrylonitrile to form beta-cyanoethyltrichlorosilane. Employing the process of the present invention, higher yields and reaction rates are obtained than are obtained employing prior art methods such as methods employing tributylamine alone as a catalyst. In addition, the process of my invention is applicable to the preparation of hydrolyzable silanes containing more than one silicon-bonded beta-cyanoalkyl radical such as the formation of bis-(beta-cyanoethyl)dichlorosilane by the addition of one mole of dichlorosilane to two moles of acrylonitrile.

In carrying out the process of the present invention, the hydrolyzable silicon hydride, the alpha, beta-unsaturated olefinic nitrile and the various components of the multiple component catalyst system are added to a reaction vessel in any desired order. No adverse effect has been observed by varying the order of addition of the reactants. In general, it is desirable to agitate the reaction mixture to obtain optimum reaction rates. However, agitation is not critical to the successful completion of the reaction. One of the most useful methods of agitating the reaction mixture is by heating the reaction mixture at its reflux temperature until the reaction is completed. Gentle refluxing of the reaction mixture provides suitable agitation and optimum reaction rates. Generally, the temperature of the reaction mixture varies during the course of the reaction and varies also depending on the particular reactants. Generally, however, the reflux temperature during reaction is from about 50° C. to about 120 to 130° C. In addition to refluxing the reaction mixture under atmospheric conditions, the reaction mixture may be heated at the reflux temperature corresponding to reduced pressures or elevated pressures. At higher pressures, the reflux temperature will increase correspondingly, for example, to a temperature of 120 to 150 or 160° C. While increasing the pressure and reflux temperature under which the reaction is conducted increases the reaction rate somewhat, it has been found that the most convenient means of effecting the reaction is at atmospheric pressure in conventional equipment rather than in the pressure equipment required for higher pressure operation. It should also be understood that the reaction of the present invention may be effected by placing the reactants in a pressure vessel and heating the contents of the vessel to an elevated temperature. In addition to conducting the reaction at the reflux temperature, the reaction will also proceed at temperatures as low as room temperature (i.e., a temperature of around 20° C.) with or without agitation. The reaction of the present invention may also be effected in either the presence or the absence of additional inert solvents. In the preferred embodiment of the present invention, no solvent is employed. However, the use of solvents which are inert under the reaction conditions is not precluded. Such solvents includes, for example, acetonitrile and adiponitrile. No particular advantage is derived from the use of solvents in the reaction. The reaction can also be effected on a continuous basis by passing the reactants and catalyst composition through a hot tube reactor.

In order that those skilled in the art may better understand how the present invention may be practiced, the following examples are given by way of illustration and not by way of limitation.

EXAMPLE 1

A mixture of 0.15 mole of acylonitrile and 0.22 mole of methyldichlorosilane were added to a reaction vessel equipped with a thermometer and reflux condenser and the mixture was heated to its boiling point of about 54° C. To this mixture was added 0.007 mole of N,N,N',N'-tetramethylethylenediamine, 0.01 mole cuprous chloride and 0.017 mole of tributylamine. The mixture was heated at reflux for nine hours during which time the reflux temperature rose from 54° C. to about 63° C. At this time an additional 0.01 mole of cuprous chloride was added and the reflux temperature rose to 150° C. after 25 aditional hours. On the basis of total moles of the acrylonitrile and methyldichlorosilane employed in this example, the diamine was present in an amount equal to 1.9 mole percent, the cuprous chloride was present in an amount equal to 5.4 mole percent and the tributylamine was present in an amount equal to 4.6 mole percent. The reaction mixture was rectified and the beta-cyanoethylmethyldichlorosilane fraction was collected at 79 to 84° C. at 6 mm. (literature boiling point for this compound is 87° C. at 7 mm.). The identity of the beta-cyanoethylmethyldichlorosilane was confirmed by infrared analysis. The percent conversion to beta-cyanoethylmethyldichlorosilane, based on the limiting reactant acrylonitrile, was 71%.

EXAMPLE 2

A mixture of 0.17 mole of acrylonitrile, 0.22 mole of of methyldichlorosilane, 0.007 mole of N,N,N',N'-tetramethylethylenediamine, 0.04 mole cuprous chloride and 0.03 mole tributylamine was added to a reaction vessel containing 0.17 mole adiponitrile as a solvent and heated at the reflux temperature, which at the end of 22 hours was 165° C. Rectification of the resulting mixture produces beta-cyanoethylmethylidichlorosilane having a boiling point of 84 to 86° C. at 7 mm. Identity of the product was confirmed by infrared analysis. The beta-cyanoethylmethyldichlorosilane was recovered in an amount equal to a 66% conversion based on the limiting reactant acrylonitrile. In this example, based on a total of one mole of acrylonitrile and methyldichlorosilane, the diamine was present in an amount equal to 1.8 mole percent, the cuprous chloride was present in an amount equal to 10.2 mole percent and the tribuytlamine was present in an amount equal to 7.7 mole percent. As shown by the percent conversion, the presence of the solvent exhibited no substantial effect on the reaction. A run similar to that of Example 2 was carried out employing acetonitrile as a solvent with results substantially identical to the results of this example.

EXAMPLE 3

This example illustrates the use of several trialkylamines other than the tributylamine of Examples 1 and 2. In this example, the reaction mixture consisted of 0.15 mole of acrylonitrile, 0.22 mole of methyldichlorosilane, 0.007 mole of N,N,N',N'-tetramethylethylenediamine, 0.02 mole of cuprous chloride and various numbers of moles of the trialkylamine. In each case, the reaction mixture was heated at its reflux temperature for approximately 60 hours and in those cases where reaction took place, the reaction product, beta-cyanoethylmethyldichlorosilane, was separated by fractional distillation. In Table I below are listed the trialkylamine employed, the number of moles of the particular trialkylamine employed, and the percent conversion of the limiting reactant acrylonitrile to the beta-cyanoethylmethyldichlorosilane.

Table I

| Amine | Amount, mole | Percent Conversion |
| --- | --- | --- |
| Triethylamine | .028 | 60+. |
| Triamylamine | .014 | 47. |
| Octadecyldimethylamine | .015 | 60. |
| Diethylamine | .02 | No reaction. |

As shown by Table I, satisfactory results were obtained using triethylamine, triamylamine and octadecyldimethylamine. With the dialkylamine, diethylamine, no reaction occurred.

EXAMPLE 4

This example illustrates the use of diamines other than the N,N,N',N'-tetramethylethylenediamine of Examples 1 and 2 in the process of the present invention employing the system of Example 1. A reaction vessel was charged with 0.15 mole acrylonitrile, 0.22 mole methyldichlorosilane, 0.02 mole cuprous chloride, 0.017 mole tributylamine and varying amounts of various diamines. In each case, the ingredients were added to a reaction vessel and heated at the reflux temperature for various times. The reaction mixture was then rectified to isolate the beta-cyanoethylmethyldichlorosilane. The table below lists the particular diamine employed, the reaction time, and the yield of beta-cyanoethylmethyldichlorosilane as percent conversion based on the weight of the acrylonitrile employed in the reaction.

Table II

| Amine | Amount, mole | Reflux Time, hours | Percent Conversion |
| --- | --- | --- | --- |
| N,N,N',N'',N''-pentamethyldiethylenetriamine | .020 | 60 | 66 |
| N,N,N',N'- tetraethylethylenediamine | .020 | 130 | 10 |
| N,N,N'-trimethylethylenediamine | .020 | 145 | 19 |
| N,N'-dimethyl-N',N'-diethylethylenediamine | .020 | 72 | 46 |
| N,N-dimethylethylenediamine | .020 | 120 | 58 |
| N'-methyl-N,N'-N'-triethylethylenediamine | .020 | 145 | 16 |
| N,N,N'-trimethyl-N'-ethylethylenediamine | .020 | 60 | 60 |

As shown by Table II, all of the listed amines, which are within the scope of Formula 1 are satisfactory for use in the process of the present invention even though the use of some of these diamines does not result in as high a yield of desired product as is obtained with other of the diamines.

EXAMPLE 5

This example illustrates the use of elevated pressures and temperatures in the practice of the present invention. In each case, a reaction mixture consisting of 0.15 mole acrylonitrile, 0.22 mole methyldichlorosilane, 0.02 mole cuprous chloride, 0.017 mole tributylamine and 0.02 mole of various diamines were added to a bomb which was heated in a 110° C. bath, at which temperature the pressure within the bomb was approximately 20 atmospheres. Table III below indicates the particular diamine employed, the reaction time and the percent conversion of acrylonitrile to beta-cyanoethylmethyldichlorosilane.

Table III

| Amine | Reaction Time, hours | Percent Conversion |
| --- | --- | --- |
| N,N,N',N'-tetramethylethylene-diamine | 5.5 | 36 |
| N,N,N',N'-tetramethylmethylene-diamine | 17 | 16 |
| N,N,N',N'-tetramethylpropylene-diamine | 17 | 30 |

EXAMPLE 6

This example illustrates the process of the present invention employing cuprous oxide in the catalyst composition. A mixture of 0.15 mole acrylonitrile, 0.22 mole methyldichlorosilane, 0.007 mole N,N,N',N'-tetramethylethylenediamine, 0.017 mole tributylamine, and 0.014 mole cuprous oxide was added to a reaction vessel and heated at the reflux temperature for about 24 hours. At the end of this time, the beta-cyanoethylmethyldichlorosilane was recovered by fractional distillation. The product recovered represented a 70% conversion based on the starting acrylonitrile.

EXAMPLE 7

This example illustrates the use of cuprous iodide as the cuprous compound in the present invention. The reactants employed were the same as in Example 6 except that 0.013 mole cuprous iodide, calculated as CuI, was substituted for the cuprous oxide. After refluxing for 120 hours a 20% conversion of acrylonitrile to beta-cyanoethylmethyldichlorosilane had been obtained. When the procedure of this example was repeated with cuprous cyanide, cuprous thiocyanate, or halides of metals other than copper in place of the cuprous iodide, no beta-cyanoethylmethyldichlorosilane was obtained.

EXAMPLE 8

This example illustrates the use of the catalyst system of the present invention for the addition of methyldichlorosilane to methacrylonitrile to form beta-cyanopropylmethydichlorosilane. A reaction vessel was charged with 0.20 mole of methacrylonitrile, 0.22 mole of methyldichlorosilane, 0.007 mole of N,N,N'N'-tetramethylethylenediamine, 0.02 mole cuprous chloride and 0.017 mole tributylamine. This mixture was then heated at reflux temperature for about 100 hours and the reaction product was fractionally distilled to yield beta-cyanopropylmethyldichlorosilane in approximately 15% conversion based on the starting methacrylonitrile. When this run was repeated, substituting 0.2 mole of allyl cyanide, which is outside of the scope of the olefinic nitriles of Formula 4, for the methacrylonitrile of this example substantially no reaction occurred.

EXAMPLE 9

This example illustrates the formation of beta-cyanoethylphenyldichlorosilane by the addition of phenyldichlorosilane to acrylonitrile. To a reaction vessel was added 0.20 mole phenyldichlorosilane, 0.15 mole acrylonitrile, 0.007 mole N,N,N',N'-tetramethylethylenediamine, 0.02 mole cuprous chloride and 0.017 mole tributylamine. This reaction mixture was heated at its reflux temperature for 6 hours to produce beta-cyanoethylphenyldichlorosilane which was separated from the reaction mixture by fractional distillation and which was recovered in a conversion of 64% based on the starting acrylonitrile. When the procedure of this example was repeated employing other difunctional material in the place of difunctional materials within the scope of Formula 2 no reaction product was obtained. For example, when methyldiethoxysilane was substituted for the phenyldichlorosilane of this example, no addition product was obtained. When a high molecular weight linear methyl hydrogen polysiloxane was substituted for the phenyldichlorosilane, the reaction mixture gelled. Gelling also occurred when the cyclic tetramer of methyl hydrogen siloxane was substituted for the phenyldichlorosilane of this example.

EXAMPLE 10

This example illustrates the preparation of beta-cyanoethyltrichlorosilane by the addition of trichlorosilane to acrylonitrile. Into a reaction vessel were placed 2.0 moles acrylonitrile, 0.1 mole of N,N,N',N'-tetramethylethylenediamine, 0.2 mole cuprous chloride and 0.2 mole triethylamine. Over a one-hour period 2.0 moles trichlorosilane were added to the reaction vessel while the vessel was cooled with an ice bath. Despite the slow addition of trichlorosilane and the ice bath the reaction proceeded at such a rapid rate that the reaction temperature remained above 80° C. After the addition, the reaction mixture was allowed to stand overnight, after which it was fractionally distilled to yield beta-cyanoethyltrichlorosilane, with the percent conversion based on the starting acrylonitrile being 66 percent.

In Examples 11 to 15 which follow, methyldichlorosilane is added to acrylonitrile to form beta-cyanoethylmethyldichlorosilane with the ratio of acrylonitrile to methyldichlorosilane being the principal variant. In Table IV below are listed the moles of acrylonitrile and methyldichlorosilane employed in each example, the mole percent of catalyst components, cuprous chloride, N,N,N',N'-tetramethylethylenediamine, and triethylamine, said mole percent being based on the total number of moles of acrylonitrile and methyldichlorosilane. Table IV also lists the temperature $T_0$ of reflux at the beginning of the reaction, the temperature $T_f$ at the end of the reaction, the reflux time and the percent conversion to beta-cyanoethylmethyldichlorosilane based on the limiting reactant, acrylonitrile or methyldichlorosilane.

Table IV

| | Ex. 11 | Ex. 12 | Ex. 13 | Ex. 14 | Ex. 15 |
| --- | --- | --- | --- | --- | --- |
| Acrylonitrile, moles | 2.00 | 1.02 | 0.755 | 1.00 | 1.00 |
| Methyldichlorosilane, moles | 2.00 | 1.10 | 1.00 | 0.91 | 0.70 |
| Cuprous Chloride, mole percent | 2.5 | 2.36 | 2.85 | 2.61 | 2.95 |
| Diamine, mole percent | 2.5 | 2.36 | 2.85 | 2.61 | 2.95 |
| Triethylamine, mole percent | 3.5 | 3.30 | 3.99 | 3.66 | 4.12 |
| $T_0$, °C | 52 | 48 | 50 | 51 | 51 |
| $T_f$, °C | 130 | 111 | 128 | 123 | 113 |
| Reflux time, hours | 32 | 33.5 | 29 | 33.5 | 28.5 |
| Percent Conversion | 72 | 61 | 87 | 66 | 64 |

Examples 16 through 19, which follow, illustrate the effect of cuprous chloride concentration on the reaction of the present invention. In these examples, the charge to the reaction vessel consisted of 0.151 mole acrylonitrile and 0.22 mole methyldichlorosilane, and based on the total number of moles of acrylonitrile and methyldichlorosilane, 4.56 mole percent tributylamine, 1.77 mole percent of N,N,N',N'-tetramethylethylenediamine, and varying amounts of cuprous chloride. In each example, the reaction mixture was refluxed for 26.5 hours with the initial and final temperature being recorded. At the end of the reflux period, the beta-cyanoethylmethyldichlorosilane was recovered from the reaction mixture by fractional distillation. In Table V below the mole percent of cuprous chloride, the initial temperature $T_0$, the final temperature $T_f$ and the percent conversion to beta-cyanoethylmethyldichlorosilane based on the starting acrylonitrile are listed.

Table V

|  | Ex. 16 | Ex. 17 | Ex. 18 | Ex. 19 |
|---|---|---|---|---|
| Cuprous chloride, mole percent | 2.70 | 5.40 | 8.10 | 10.80 |
| $T_0$, °C | 50 | 51 | 50 | 51 |
| $T_f$, °C | 91 | 79 | 55 | 54 |
| Percent conversion | 60+ | 50+ | None | None |

As shown in Table V, when employing 8.10 and 10.80 mole percent of cuprous chloride, essentially no reaction occurred and no beta-cyanoethylmethyldichlorosilane was obtained. When the cuprous chloride content was reduced to 2.70 and 5.40 mole percent acceptable yields of the beta-cyanoethylmethyldichlorosilane were obtained. This is explained by the ratio of nitrogen atoms to copper atoms in each catalyst composition. In Examples 16 and 17 there is an excess of nitrogen atoms. In Example 18 there is no such excess, since the number of nitrogen atoms and copper atoms is equal. In Example 19, the copper atoms are present in excess.

Examples 20 through 22, which follow, describe the effect of varying the trialkylamine concentration in the process of the present invention. In each example, the charge to the reaction vessel consisted of 2.00 moles acrylonitrile, 2.00 moles methyldichlorosilane, and based on the total number of moles of acrylonitrile and methyldichlorosilane, 5.0 mole percent cuprous chloride, 5.0 mole percent N,N,N',N'-tetramethylethylenediamine, and varying amounts of triethylamine. The reactants were added to a reaction vessel and refluxed for 17 hours at atmospheric pressure with the temperature at the beginning of the reflux, $T_0$, and the temperature at the end of the reflux, $T_f$, being recorded. At the end of the reflux period, the reaction mixture was cooled and sufficient hydrogen chloride was bubbled through the reaction mixture to form the hydrochlorides of the diamine and the triethylamine, which hydrochlorides precipitated and were filtered from the reaction mixture. The filtrate was then fractionally distilled to recover the beta-cyanoethylmethyldichlorosilane formed. In Table VI below are listed the mole percent of triethylamine, the initial temperature of reflux, the final temperature of reflux, and the percent conversion to beta-cyanoethylmethyldichlorosilane of the starting acrylonitrile.

Table VI

|  | Ex. 20 | Ex. 21 | Ex. 22 |
|---|---|---|---|
| Triethylamine, mole percent | 2.5 | 5.0 | 15 |
| $T_0$, °C | 51 | 52 | 52 |
| $T_c$, °C | 54 | 60 | 78 |
| Percent conversion | 10 | 20 | 45 |

Examples 23 through 26, which follow, show the effect of varying the diamine concentration in the process of the present invention. In each of these examples, the charge to the reaction vessel consisted of 1 mole methyldichlorosilane and 1 mole of acrylonitrile and, based on the total number moles of methyldichlorosilane and acrylonitrile, 2.5 mole percent triethylamine, 2.5 mole percent cuprous chloride and varying amounts of N,N,N',N'-tetramethylethylenediamine. The reaction mixture was heated for 48 hours at reflux with the temperature at the beginning and end of reflux being recorded. The beta-cyanoethylmethyldichlorosilane formed was isolated by the method of Examples 20 to 22. In Table VII below are listed the mole percent of diamine employed, the initial and final reflux temperatures and the percent conversion.

Table VII

|  | Ex. 23 | Ex. 24 | Ex. 25 | Ex. 26 |
|---|---|---|---|---|
| N,N,N',N'-tetramethylethylenediamine, mole percent | 1.35 | 0.65 | 0.16 | 0.03. |
| $T_0$, °C | 51 | 50 | 49 | 48. |
| $T_f$, °C | 81 | 57 | 52 | 51. |
| Percent conversion | 68 | 28 | 3 | Less than 1. |

As shown in Table VII, the percent conversion is relatively good when the reaction mixture contains 1.35 mole percent diamine. The table also shows that as diamine concentration decreases, the percent conversion decreases. As is shown by Example 26 in Table VII, as the concentration of the diamine falls below about 0.1 mole percent, only a small amount of beta-cyanoethylmethyldichlorosilane is obtained.

Examples 27 through 34, which follow, illustrate the two-component catalyst system of the present invention in which the catalyst comprises a diamine within the scope of Formula 1 and a cuprous compound.

EXAMPLE 27

A mixture of 2.0 moles acrylonitrile and 2.0 moles methyldichlorosilane was added to a stirred mixture of 2.5 mole percent cuprous chloride and 12.5 mole percent of N,N,N',N'-tetramethylethylenediamine over a period of two hours during which time the mixture in the reaction flask was maintained at a temperature of 80° to 90° C. The concentration of the cuprous chloride and the diamine are on the basis of the total moles of acrylonitrile and methyldichlorosilane. The reaction mixture was then refluxed for an additional 17 hours during which time the temperature rose to 119° C. At this time the reaction mixture was fractionally distilled and the beta-cyanoethylmethyldichlorosilane formed was collected. The percent conversion to beta-cyanoethylmethyldichlorosilane was 52% based on the starting acrylonitrile and methyldichlorosilane.

Examples 28 to 30, which follow, illustrate the variation in cuprous chloride content of the two-component catalyst system of the present invention. In these examples, a reaction vessel was charged with 1.0 mole acrylonitrile, 1.0 mole methyldichlorosilane, and based on the total moles of the acrylonitrile and methyldichlorosilane, 6.25 mole percent N,N,N',N'-tetramethylethylenediamine and varying mole percents of cuprous chloride. The reaction mixture was then refluxed at atmospheric pressure for varying times and the temperatures at the beginning of reflux and at the end of reflux were recorded. At the end of the reflux period the beta-cyanoethylmethyldichlorosilane was recovered from the reaction mixture by fractional distillation. In Table VIII below are listed the mole percent cuprous chloride in the reaction mixture based on the total number of moles of acrylonitrile and methyldichlorosilane, the temperature $T_0$ at the beginning of the reflux period, the temperature $T_f$ at the end of the reflux period, the reflux time, and the percent conversion of the starting acrylonitrile and methyldichlorosilane to the desired beta-cyanoethylmethyldichlorosilane.

Table VIII

|  | Ex. 28 | Ex. 29 | Ex. 30 |
|---|---|---|---|
| Cuprous chloride, mole percent | 2.50 | 1.50 | 0.50 |
| $T_0$, °C | 47 | 52 | 53 |
| $T_f$, °C | 132 | 119 | 91 |
| Reflux time, hours | 22 | 22 | 29 |
| Percent conversion | 55 | 55 | 39 |

Examples 31 to 34, which follow, illustrate the effect of variation of the diamine in the two-component system. In these examples, the charge to the reaction vessel consisted of 1 mole each of methyldichlorosilane and acrylonitrile and, on the basis of the total moles of methyldichlorosilane and acrylonitrile, 2.5 mole percent cuprous chloride and varying mole percents of N,N,N',N'-tetramethylethylenediamine. These reaction mixtures were heated at reflux for 48 hours and the beta-cyanoethylmethyldichlorosilane product was isolated by the method of Examples 20 to 22. Table IX below lists the mole percent of N,N,N',N'-tetramethylethylenediamine, the initial and final reflux temperatures and the percent conversion.

*Table IX*

|  | Ex. 31 | Ex. 32 | Ex. 33 | Ex. 34 |
|---|---|---|---|---|
| N,N,N',N'-tetramethylethylene-diamine, mole percent | 3.0 | 1.5 | 0.4 | 0.015 |
| $T_0$, ° C | 50 | 50 | 49 | 47 |
| $T_f$, ° C | 65 | 52 | 51 | 50 |
| Percent conversion | 30 | 4 | 0 | 0 |

As is shown in Examples 31 and 32, when there was an excess of nitrogen atoms over copper atoms, the reaction proceeded to produce the desired product beta-cyanoethylmethyldichlorosilane. When an excess of copper atoms was present as in Examples 33 and 34, none of the desired product was obtained.

EXAMPLE 35

This example illustrates the use of elevated pressures and temperatures carrying out the process of the present invention employing a two-component catalyst system. A reaction mixture comprising 0.15 mole acrylonitrile, 0.22 mole methyldichlorosilane, 0.02 mole cuprous chloride and 0.02 mole N,N,N',N'-tetramethylethylenediamine was added to a bomb which was heated in a 110° C. bath, at which temperature the pressure within the bomb was approximately 20 atmospheres. At the end of 17 hours, the pressure on the bomb was released and the beta-cyanoethylmethyldichlorosilane formed was isolated in an amount equal to a 12 percent conversion based on the starting acrylonitrile.

Although the foregoing examples have of necessity been limited to less than all of the myriads of variations of components and compositions within the scope of the present invention, it should be understood that wide variations are permissible without departing from the scope of the present invention so long as the process of the present invention involves reactants within the scope of Formulae 2 and 4 and so long as the catalyst composition contains both the cuprous compound selected from the class consisting of cuprous halides and cuprous oxide and the diamine within the scope of Formula 1. For the two-component catalyst composition, the cuprous compound and the diamine are the sole components of the catalyst system. For the three-component catalyst system, the above two components are included plus the trialkylamine within the scope of Formula 5. In addition to using the cuprous compound per se, it is also possible to employ cupric compounds, such as cupric chloride or cupric oxide, which are reduced under the conditions of the addition reaction to cuprous compounds within the scope of the present invention.

While the examples have shown a reaction involving only a single hydrolyzable silicon hydride and a single olefinic nitrile, it should be understood that mixtures of one or more of these components can be employed. For example, a mixture of methyldichlorosilane and phenyldichlorosilane can be reacted with a mixture of acrylonitrile and methacrylonitrile. Similarly, more than one of each type of catalyst component can be employed in the catalyst composition. Thus, a catalyst composition can contain two or more diamines, two or more cuprous compounds within the scope of the present invention, or two or more trialkylamines.

As explained previously, the difunctional and trifunctional beta-cyanoalkyl hydrolyzable silanes prepared by the process of the present invention are particularly useful in the preparation of polymeric organosiloxanes containing silicon-oxygen-silicon linkages. The difunctional materials within the scope of Formula 4 when $n$ is equal to 1 are particularly useful in the preparation of organosilicon oils and elastomers. For example, a copolymer of beta-cyanoethylmethylsiloxane units and methyl siloxane units is prepared by mixing equal parts by weight of beta-cyanoethylmethyldichlorosilane and dimethyldichlorosilane with ten parts of diethyl ether and one part of ice water based on the weight of the chlorosilanes. After thoroughly agitating the reaction mixture, it is allowed to separate into three phases, the top phase of which is an oil layer. This oil layer is separated and consists of a hydroxy chain-stopped silicone fluid containing recurring beta-cyanoethylmethylsiloxane units and dimethylsiloxane units. This oil is useful per se as a lubricant and hydraulic fluid. This fluid is converted to a gum by mixing the fluid with potassium hydroxide in the ratio of about 30 parts per million potassium hydroxide in the oil. After heating this mixture at a temperature of about 150° C. for four hours, a gum having a viscosity in excess of 1,000,000 centipoises is obtained. This gum is then milled with an equal amount of a silica filler such as a silica aerogel and with five parts by weight per 100 parts of the filler gum compound of benzoyl peroxide and heated at a temperature of 250° C. for 24 hours to produce a silicone rubber which is characterized by all of the desirable features of conventional silicone rubbers and which has the additional feature of superior resistance to swelling in hydrocarbon solvents. This type of silicone rubber is particularly useful for gasket applications in the aircraft industry where the gasket must encounter extremes of high temperature and low temperature and must at the same time come in contact with conventional aircraft fuels.

The trifunctional materials of the present invention are useful in the same manner as other trifunctional organosilicon materials. Thus, beta-cyanoethyltrichlorosilane may be added in a minor amount to difunctional dichlorosilanes in the formation of organosilicon fluids. Beta-cyanoethyltrichlorosilane can also be employed with other halogenosilanes such as dimethyldichlorosilane, trimethylchlorosilane and methyltrichlorosilane in the formation of organosilicon resinous materials which are characterized by the properties of conventional silicone resins but have the additional resistance to the effect of hydrocarbon solvents which are imparted by the presence of the beta-cyanoethyl radicals.

What I claim as new and desire to secure by Letters Patent of the United States is:

1. The method of forming a cyanoalkylsilane having the formula

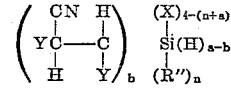

which method comprises effecting reaction by contacting a hydrolyzable silicon hydride having the formula

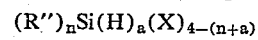

with an alpha,beta-unsaturated olefinic nitrile having the formula

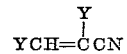

where $a$ is an integer equal to from 1 to 3, inclusive, $b$ is an integer equal to from 1 to 2, inclusive, $n$ is a whole number having a value of from 0 to 1, inclusive, the sum of $n+a$ is from 1 to 3, inclusive, and $a-b$ is a whole number from 0 to 2, inclusive, X is halogen, R" is a monovalent hydrocarbon radical and Y is a member selected from the class consisting of hydrogen and the lower alkyl radicals, said reaction being carried out in the presence of a catalyst composition comprising in mole percent, based on the total number of moles of said hydrolyzable silicon hydride and said alpha,beta-unsaturated olefinic nitrile, (A) from 0.1 to 20 mole percent of a cuprous compound selected from the class consisting of cuprous oxide and cuprous halides, (B) from 0.1 to 20 mole percent of a diamine having the formula $(R)(R')N(CH_2)_mN(R')_2$ where $m$ is an integer equal to from 1 to 6, inclusive, R is a lower alkyl radical and R' represents members selected from the class consisting of hydrogen, lower alkyl radicals, aminoalkyl radicals, alkylaminoalkyl radicals, and dialkylaminoalkyl radicals, and (C) from 0 to 20 mole percent of a trialkylamine having the formula $(Y')_3N$ where Y' is a lower alkyl radical, the total number of nitrogen atoms in said catalyst composition being in excess of the total number of copper atoms.

2. The method of forming a beta-cyanoalkylsilane containing at least one silicon-bonded beta-cyanoalkyl radical, at least one silicon-bonded halogen atom, up to one silicon-bonded hydrocarbon radical and up to two silicon-bonded hydrogen atoms, which method comprises effecting reaction by contacting a hydrolyzable silicon hydride in which the four valences of silicon are satisfied by at least one silicon-bonded hydrogen, at least one silicon-bonded halogen and up to one silicon-bonded hydrocarbon radical with an alpha,beta-unsaturated olefinic nitrile, said reaction being carried out in the presence of a catalyst composition comprising, in mole percent based on the total number of moles of said hydrolyzable silicon hydride and said alpha,beta-unsaturated olefinic nitrile, (A) from 0.1 to 20 mole percent of a cuprous compound selected from the class consisting of cuprous oxide and cuprous halides, (B) from 0.1 to 20 mole percent of a diamine having the formula $$(R)(R')N(CH_2)_mN(R')_2$$

where $m$ is an integer equal to from 1 to 6, inclusive, R is a lower alkyl radical, and R' represents members selected from the class consisting of hydrogen, lower alkyl radicals, aminoalkyl radicals, alkylaminoalkyl radicals and dialkylaminoalkyl radicals, and (3) from 0 to 20 mole percent of a trialkylamine, the total number of nitrogen atoms in said catalyst composition being in excess of the total number of copper atoms.

3. The process of claim 2 in which the cuprous compound is cuprous chloride.

4. The method of claim 2 in which the cuprous compound is cuprous oxide.

5. The method of claim 2 in which the diamine is N,N,N',N'-tetramethylethylenediamine.

6. The method of claim 2 in which the trialkylamine is triethylamine.

7. The method of claim 2 in which the trialkylamine is tributylamine.

8. The method of forming beta-cyanoethylmethyl dichlorosilane which comprises effecting reaction by contacting methyldichlorosilane with acrylonitrile in the presence of a catalyst composition comprising, in mole percent based on the total number of moles of acrylonitrile and methyldichlorosilane, (A) from 0.1 to 20 mole percent of a cuprous compound selected from the class consisting of cuprous oxide and cuprous halides, (B) from 0.1 to 20 mole percent of a diamine having the formula $(R)(R')N(CH_2)_mN(R')_2$ where $m$ is an integer equal to from 1 to 6, inclusive, R is a lower alkyl radical and R' represents members selected from the class consisting of hydrogen, lower alkyl radicals, aminoalkyl radicals, and alkylaminoalkyl radicals, and dialkylaminoalkyl radicals, and (C) from 0 to 20 mole percent of a trialkylamine having the formula $(Y')_3N$ where Y' is an alkyl radical, the total number of nitrogen atoms in said catalyst composition being in excess of the total number of copper atoms.

9. The method of forming beta-cyanoethylmethyldichlorosilane which comprises effecting reaction by contacting methyldichlorosilane with acrylonitrile in the presence of a catalyst composition comprising, in mole percent based on the total number of moles of said methyldichlorosilane and said acrylonitrile, (A) from 0.1 to 20 mole percent of cuprous chloride, (B) from 0.1 to 20 mole percent of N,N,N',N'-tetramethylethylenediamine, and (C) from 0 to 20 mole percent of tributylamine, the total number of nitrogen atoms in said catalyst composition being in excess of the total number of copper atoms.

10. The method of forming beta-cyanoethylmethyldichlorosilane which comprises effecting reaction by contacting methyldichlorosilane with acrylonitrile in the presence of a catalyst composition comprising, in mole percent based on the total number of moles of said methyldichlorosilane and said acrylonitrile, (A) from 0.1 to 20 mole percent of cuprous chloride, (B) from 0.1 to 20 mole percent of N,N,N',N'-tetramethylethylenediamine, and (C) from 0 to 20 mole percent of triethylamine, the total number of nitrogen atoms in said catalyst composition being in excess of the total number of copper atoms.

11. The method of forming beta-cyanoethylphenyldichlorosilane which comprises effecting reaction by contacting phenyldichlorosilane with acrylonitrile, said reaction being effected in the presence of a catalyst composition comprising, in mole percent based on the total number of moles of said phenyldichlorosilane and said acrylonitrile, (A) from 0.1 to 20 mole percent of cuprous chloride, (B) from 0.1 to 20 mole percent of N,N,N',N'-tetramethylethylenediamine, and (C) from 0 to 20 mole percent of tributylamine, the total number of nitrogen atoms in said catalyst composition being in excess of the total number of copper atoms.

12. The method of forming beta-cyanoethyltrichlorosilane which comprises effecting reaction by contacting trichlorosilane with acrylonitrile, said reaction being effected in the presence of a catalyst composition comprising, in mole percent based on the total number of moles of said trichlorosilane and said acrylonitrile, (A) from 0.1 to 20 mole percent of cuprous chloride, (B) from 0.1 to 20 mole percent of N,N,N',N'-tetramethylethylenediamine, and (C) from 0 to 20 mole percent of tributylamine.

13. The method of forming a cyanoalkylsilane having the formula

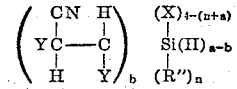

which method comprises effecting reaction by contacting a hydrolyzable silicon hydride having the formula

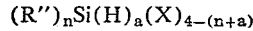

with an alpha,beta-unsaturated olefinic nitrile having the formula

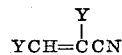

where $a$ is an integer equal to from 1 to 3, inclusive, $b$ is an integer equal to from 1 to 2, $n$ is a whole number having a value of from 0 to 1, inclusive, the sum of $n+a$ is from 1 to 3, inclusive, and $a-b$ is a whole number equal to from 0 to 2, inclusive, X is halogen, R" is a monovalent hydrocarbon radical and Y is a member selected from the class consisting of hydrogen and the lower alkyl radicals, said reaction being carried out in the presence of a catalyst composition comprising, in mole percent based on the total number of moles of said hydrolyzable silicon hydride and said alpha-beta-unsaturated olefinic nitrile, (A) from 0.1 to 20 mole percent of a cuprous compound selected from the class consisting of cuprous oxide and cuprous halides, (B) from 0.1 to 20 mole percent of a diamine having the formula $(R)(R')N(CH_2)_mN(R')_2$ where $m$ is an integer equal to from 1 to 6, inclusive, R is a lower alkyl radical and R' represents members selected from the class consisting of hydrogen, lower alkyl radicals, aminoalkyl radicals, alkylaminoalkyl radicals, and dialkylaminoalkyl radicals, and (C) from 0.1 to 20 mole percent of a trialkylamine having the formula $(Y')_3N$ where Y' is an alkyl radical, the total number of nitrogen atoms in said catalyst composition being in excess of the total number of copper atoms.

14. The method of forming beta-cyanoethylmethyldichlorosilane which comprises effecting reaction by contacting methyldichlorosilane with acrylonitrile, said reaction being effected in the presence of a catalyst composition comprising, in mole percent based on the total number of moles of said methyldichlorosilane and said acrylonitrile, (A) from 0.1 to 20 mole percent of cuprous chloride, (B) from 0.1 to 20 mole percent of N,N,N',N'-tetramethylethylenediamine, and (C) from 0.1 to 20 mole percent of tributylamine, the total number of nitrogen atoms in said catalyst composition being in excess of the number of copper atoms.

15. The method of forming beta-cyanoethylmethyldichlorosilane which comprises effecting reaction by contacting methyldichlorosilane with acrylonitrile, said reaction being effected in the presence of a catalyst composition comprising, in mole percent based on the total number of moles of said methyldichlorosilane and said acrylonitrile, (A) from 0.1 to 20 mole percent of cuprous chloride, (B) from 0.1 to 20 mole percent of N,N,N',N'-tetramethylethylenediamine, and (C) from 0.1 to 20 mole percent of triethylamine, the total number of nitrogen atoms in said catalyst composition being in excess of the total number of copper atoms.

16. The method of forming a beta-cyanoethylsilane in which the four valences of silicon are satisfied by at least one silicon-bonded beta-cyanoalkyl radical, at least one silicon-bonded halogen, up to one silicon-bonded monovalent hydrocarbon radical and up to two silicon-bonded hydrogen atoms, which method comprises effecting reaction by contacting a hydrolyzable silicon hydride in which the four valences of silicon are satisfied by at least one silicon-bonded hydrogen, at least one silicon-bonded halogen and up to one silicon-bonded monovalent hydrocarbon radical with an alpha,beta-unsaturated olefinic nitrile, said reaction being effected in the presence of a catalyst composition comprising, in mole percent based on the total number of moles of said hydrolyzable silicon hydride and said alpha,beta-unsaturated olefinic nitrile, (A) from 0.1 to 20 mole percent of a cuprous compound selected from the class consisting of cuprous oxide and cuprous halides, and (B) from 0.1 to 20 mole percent of a diamine having the formula $$(R)(R')N(CH_2)_mN(R')_2$$

where $m$ is an integer equal to from 1 to 6, inclusive, R is a lower alkyl radical and R' represents members selected from the class consisting of hydrogen, lower alkyl radicals, aminoalkyl radicals, alkylaminoalkyl radicals, and dialkylaminoalkyl radicals, the total number of nitrogen atoms in said catalyst composition being in excess of the total number of copper atoms.

17. The method of forming a beta-cyanolalkylsilane having the formula

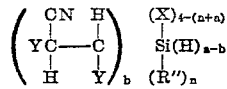

which method comprises effecting reaction by contacting a hydrolyzable silicon hydride having the formula

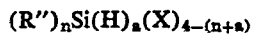

with an alpha,beta-unsaturated olefinic nitrile having the formula

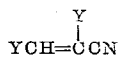

where $a$ is an integer equal to from 1 to 3, inclusive, $b$ is an integer equal to from 1 to 2, $n$ is a whole number having a value of from 0 to 1, inclusive, the sum of $n+a$ is from 1 to 3, inclusive, and $a-b$ is a whole number equal to from 0 to 2, inclusive, X is halogen, R'' is a monovalent hydrocarbon radical and Y is a member selected from the class consisting of hydrogen and lower alkyl radicals, said reaction being carried out in the presence of a catalyst composition comprising, in mole percent based on the total number of moles of said hydrolyzable silicon hydride and said alpha,beta-unsaturated olefinic nitrile, (A) from 0.1 to 20 mole percent of a cuprous compound selected from the class consisting of cuprous oxide and cuprous halides, and (B) from 0.1 to 20 mole percent of a diamine having the formula $$(R)(R')N(CH_2)_mN(R')_2$$

where $m$ is an integer equal to from 1 to 6, inclusive, R is a lower alkyl radical, and R' represents members selected from the class consisting of hydrogen, lower alkyl radicals, aminoalkyl radicals, alkylaminoalkyl radicals, and dialkylaminoalkyl radicals, the total number of nitrogen atoms in said catalyst composition being in excess of the total number of copper atoms.

18. The method of forming beta-cyanoethylmethyldichlorosilane which comprises effecting reaction by contacting methyldichlorosilane with acrylonitrile, said reaction being carried out in the presence of a catalyst composition comprising, in mole percent based on the total number of moles of said methyldichlorosilane and said acrylonitrile, (A) from 0.1 to 20 mole percent of cuprous chloride and (B) from 0.1 to 20 mole percent of N,N,N',N'-tetramethylethylenediamine, the total number of nitrogen atoms in said catalyst composition being in excess of the total number of copper atoms.

19. A catalyst composition comprising, on a mole ratio basis, (A) from 0.1 to 20 moles of a cuprous compound selected from the class consisting of cuprous oxide and cuprous chloride, (B) from 0.1 to 20 moles of a diamine having the formula

where $m$ is an integer equal to from 1 to 6, inclusive, R is a lower alkyl radical, and R' represents members selected from the class consisting of hydrogen, lower alkyl radicals, aminoalkyl radicals, alkylaminoalkyl radicals, and dialkylaminoalkyl radicals, and (C) from 0 to 20 moles of a trialkylamine, the total number of nitrogen atoms in said catalyst composition being in excess of the total number of copper atoms.

20. A catalyst composition comprising, on a mole ratio basis, (A) from 0.1 to 20 moles cuprous chloride, (B) from 0.1 to 20 moles of N,N,N',N'-tetramethylethylenediamine and (C) from 0 to 20 moles of tributylamine, the total number of nitrogen atoms in said catalyst composition being in excess of the total number of copper atoms.

21. A catalyst composition comprising, on a mole ratio basis, (A) from 0.1 to 20 moles cuprous chloride, (B) from 0.1 to 20 moles N,N,N'-N'-tetramethylethylenediamine and (C) from 0 to 20 moles of triethylamine, the total number of nitrogen atoms in said catalyst composition being in excess of the total number of copper atoms.

22. A catalyst composition comprising, on a mole ratio basis, (A) from 0.1 to 20 moles of a cuprous compound selected from the class consisting of cuprous oxide and cuprous halides, (B) from 0.1 to 20 moles of a diamine having the formula

where $m$ is an integer equal to from 1 to 6, inclusive, R is a lower alkyl radical, and R' represents members selected from the class consisting of hydrogen, lower alkyl radicals, aminoalkyl radicals, and alkylaminoalkyl radicals and dialkylaminoalkyl radicals, and (C) from 0.1 to 20 moles of a trialkylamine, the total number of nitrogen atoms in said catalyst composition being in excess of the total number of copper atoms.

23. A catalyst composition comprising, on a mole ratio basis, from 0.1 to 20 moles of cuprous chloride, from 0.1 to 20 moles of N,N,N',N'-tetramethylethylenediamine and from 0.1 to 20 moles of tributylamine, the total number of nitrogen atoms in said catalyst composition being in excess of the total number of copper atoms.

24. A catalyst composition comprising, on a mole ratio basis, from 0.1 to 20 moles of cuprous chloride, from 0.1 to 20 moles of N,N,N',N'-tetramethylethylenediamine and from 0.1 to 20 moles of triethylamine, the total number of nitrogen atoms in said catalyst composition being in excess of the total number of copper atoms.

25. A catalyst composition comprising, on a mole ratio basis, from 0.1 to 20 moles of cuprous compound selected from the class consisting of cuprous halides and cuprous oxide and from 0.1 to 20 moles of a diamine having the formula $$(R)(R')N(CH_2)_mN(R')_2$$

where $m$ is an integer equal to from 1 to 6, inclusive, R is a lower alkyl radical, and R' represents members selected from the class consisting of hydrogen, lower alkyl radicals, aminoalkyl radicals, alkylaminoalkyl radicals and dialkylaminoalkyl radicals, the total number of nitrogen atoms in said catalyst composition being in excess of the total number of copper atoms.

26. A catalyst composition comprising, on a mole ratio basis, from 0.1 to 20 moles of cuprous chloride and from 0.1 to 20 moles of N,N,N',N'-tetramethylethylenediamine, the total number of nitrogen atoms in said catalyst composition being in excess of the total number of copper atoms.

27. The method which comprises effecting reaction by contacting an alpha,beta-unsaturated olefinic nitrile with a hydrolyzable silicon hydride in which the four valences of silicon are satisfied by at least one silicon-bonded hydrogen, at least one silicon-bonded halogen and up to one silicon-bonded hydrocarbon radical, said reaction being effected in the presence of a catalyst composition selected from the class consisting of (A) a first mixture comprising (1) a cuprous compound selected from the class consisting of cuprous halides and cuprous oxide, (2) a diamine having the formula $$(R)(R')N(CH_2)_mN(R')_2$$

and (3) a trialkylamine, and (B) a second mixture comprising (1) a cuprous compound selected from the class consisting of cuprous halides and cuprous oxide and (2) a diamine having the formula $$(R)(R')N(CH_2)_mN(R')_2$$

where $m$ is an integer equal to from 1 to 6, inclusive, R is a lower alkyl radical, and R' represents members selected from the class consisting of hydrogen, lower alkyl radicals, aminoalkyl radicals, alkylaminoalkyl radicals and dialkylaminoalkyl radicals, the total number of nitrogen atoms in said catalyst composition being in excess of the total number of copper atoms.

28. A catalyst composition selected from the class consisting of (A) a first mixture comprising (1) a cuprous compound selected from the class consisting of cuprous halides and cuprous oxide, (2) a diamine having the formula $$(R)(R')N(CH_2)_mN(R')_2$$

and (3) a trialkylamine, and (B) a second mixture comprising (1) a cuprous compound selected from the class consisting of cuprous halides and cuprous oxide and (2) a diamine having the formula $$(R)(R')N(CH_2)_mN(R')_2$$

where $m$ is an integer equal to from 1 to 6, inclusive, R is a lower alkyl radical and R' represents members selected from the class consisting of hydrogen, lower alkyl radicals, aminoalkyl radicals, alkylaminoalkyl radicals and dialkylaminoalkyl radicals, the total number of nitrogen atoms in said catalyst composition being in excess of the total number of copper atoms.

References Cited in the file of this patent

UNITED STATES PATENTS 2,686,798    Gmitter    Aug. 17, 1954

FOREIGN PATENTS 1,118,500    France    Mar. 19, 1956

OTHER REFERENCES

Yoshida et al.: "Jour. Soc. Org. Synthetic Chem.," Japan, vol. 10 (1953), pp. 335–9 (Chem. Abstract, vol. 48 (1954), pp. 11, 299).